March 8, 1960
J. B. MAHER
2,927,787
PRESSURE DOOR
Filed June 12, 1958
7 Sheets-Sheet 1
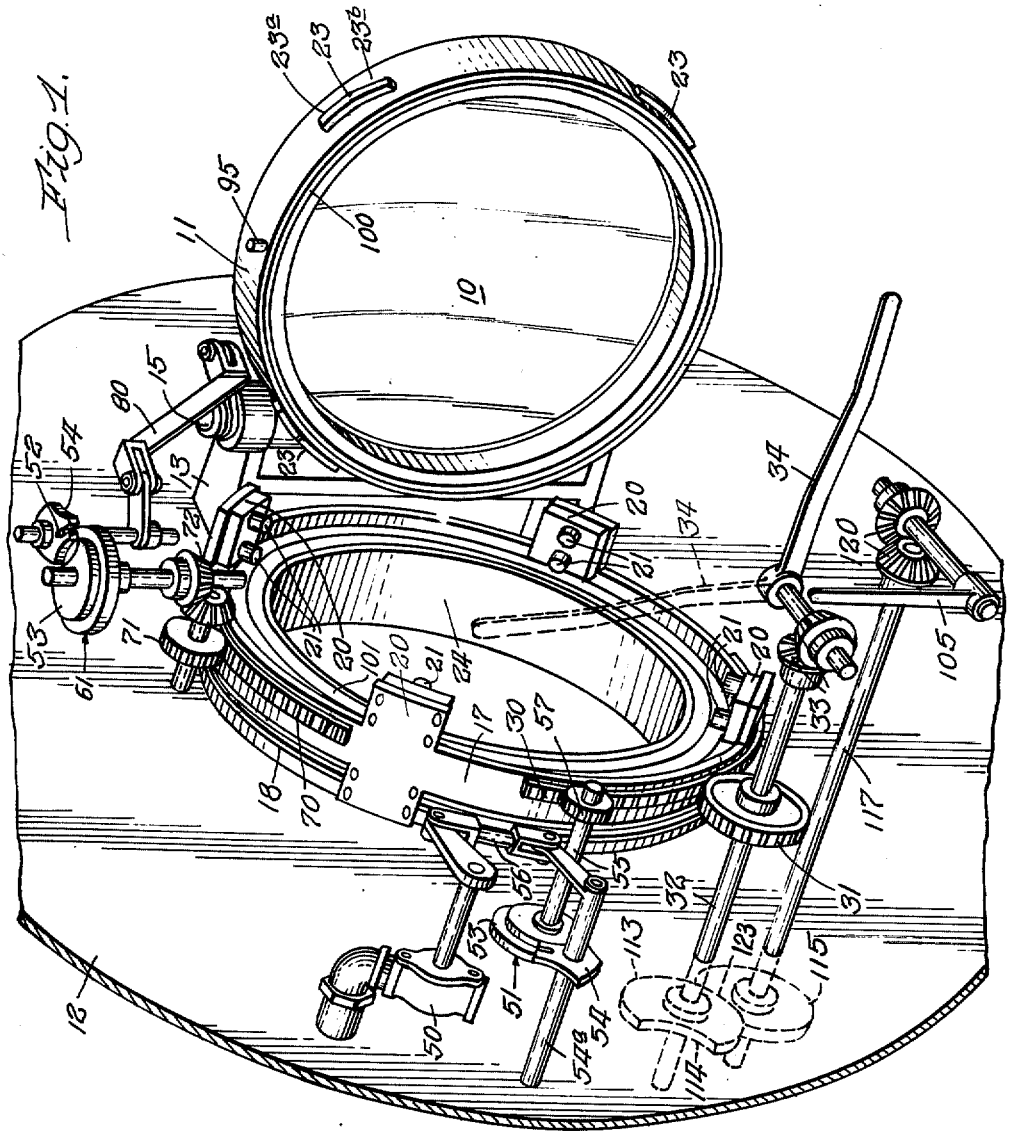
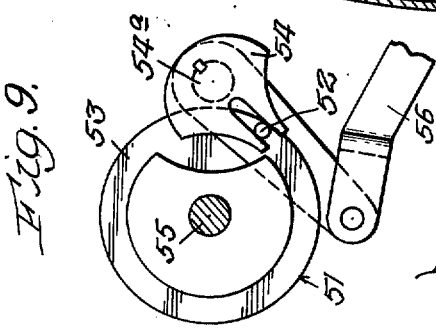
Inventor:
James B. Maher,
By Merriam, Lorch & Smith,
Attys.

March 8, 1960 J. B. MAHER 2,927,787
PRESSURE DOOR
Filed June 12, 1958 7 Sheets-Sheet 2

Inventor:
James B. Maher,
By Merriam, Lorch & Smith,
Attys.

March 8, 1960  J. B. MAHER  2,927,787
PRESSURE DOOR
Filed June 12, 1958  7 Sheets-Sheet 3

Inventor:
James B. Maher,
By Merriam, Lynch
& Smith, Attys.

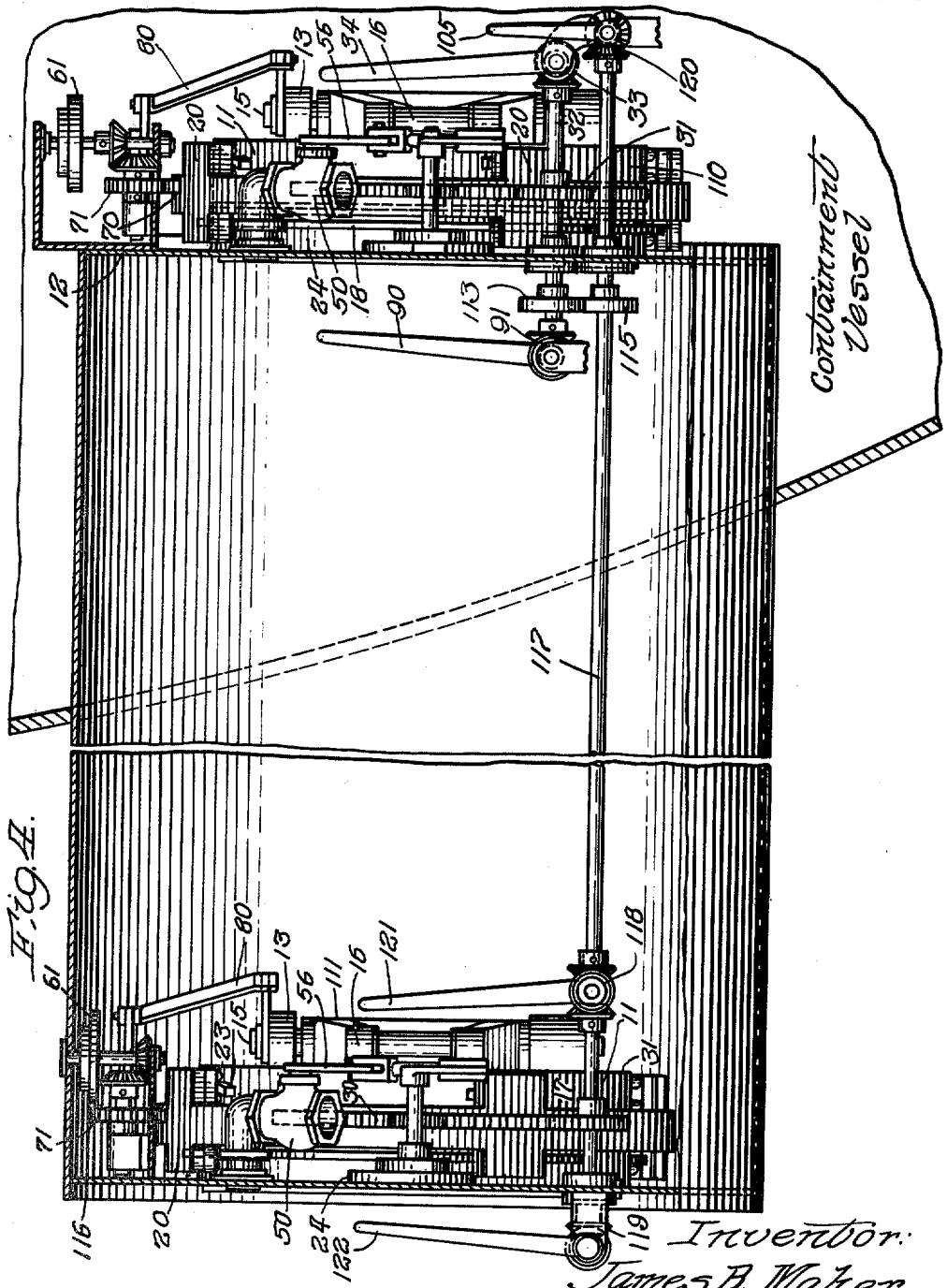

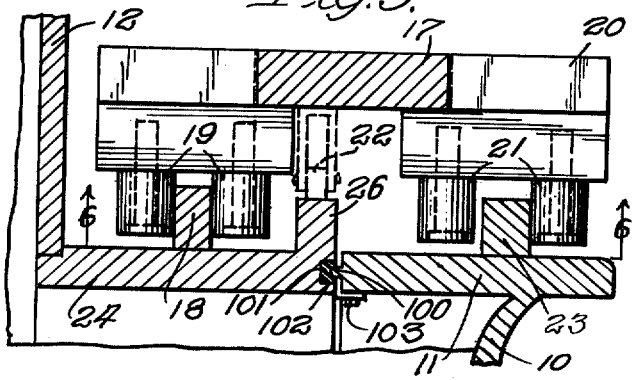
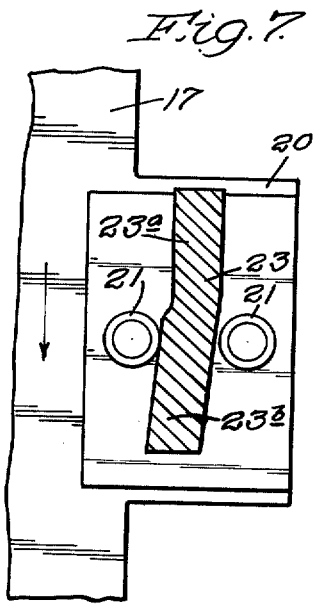
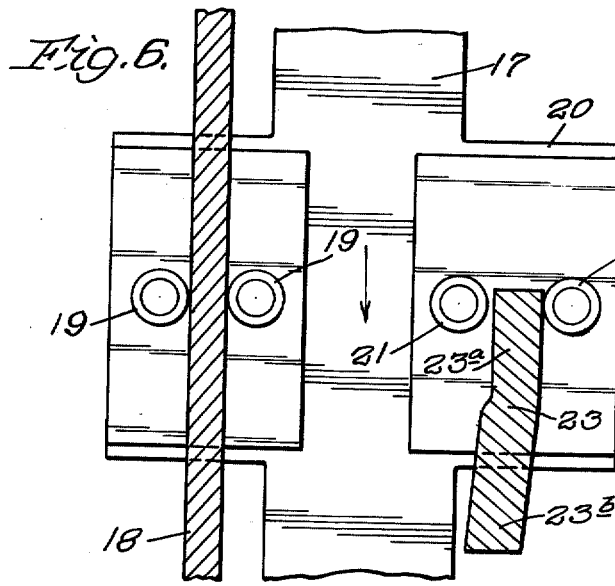
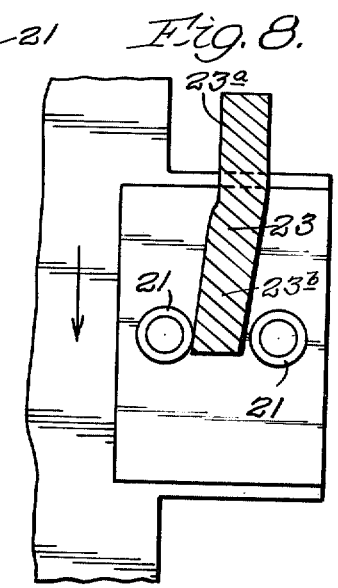
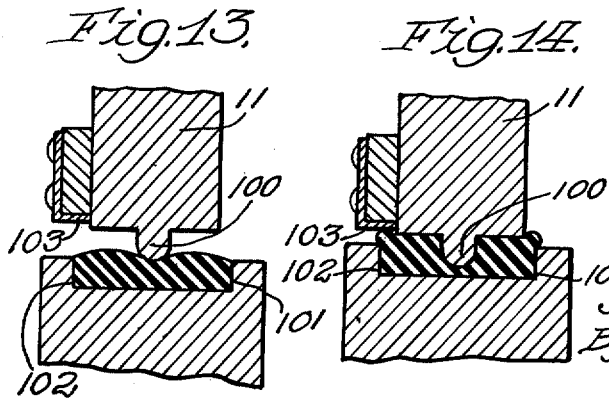

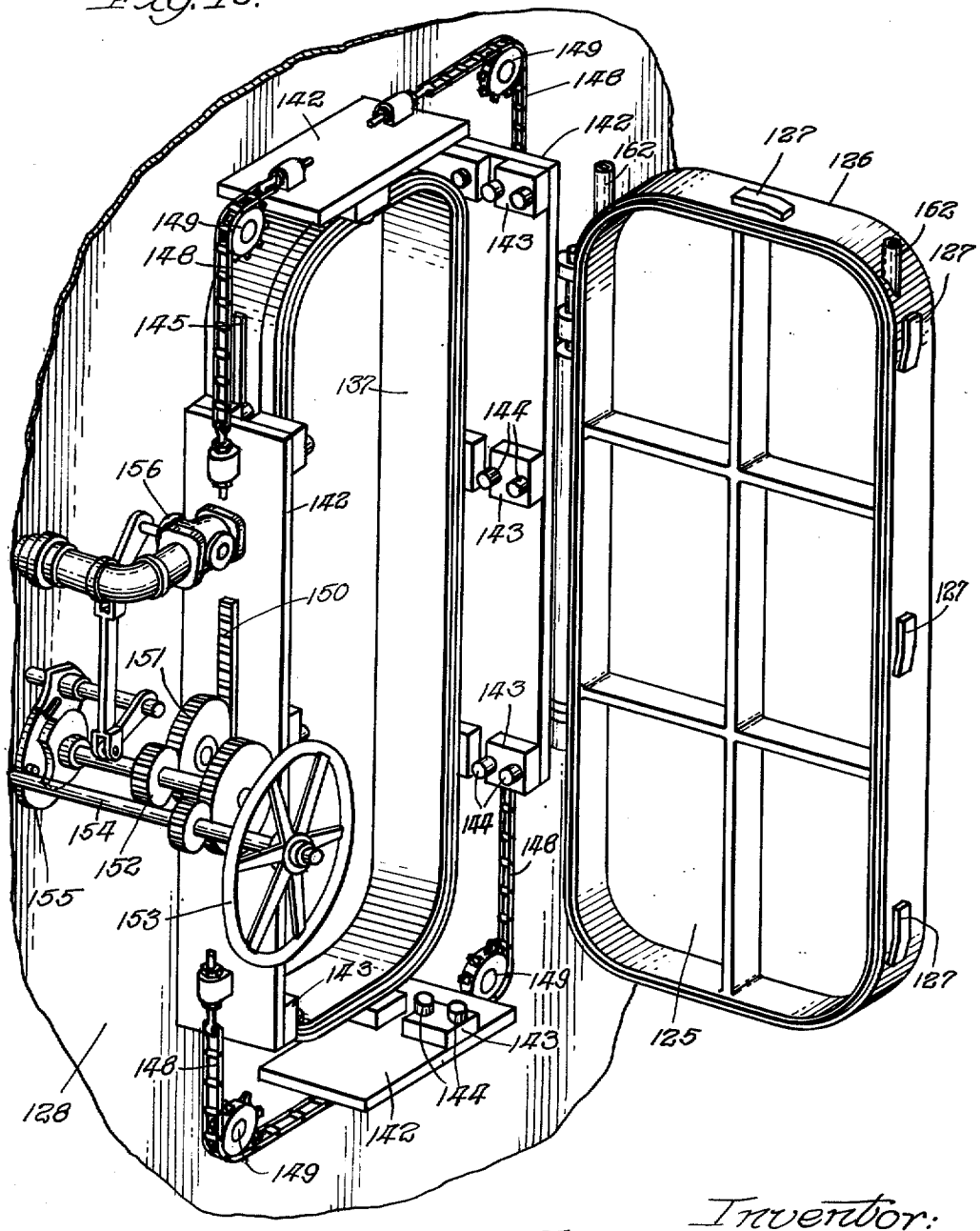

March 8, 1960 J. B. MAHER 2,927,787
PRESSURE DOOR
Filed June 12, 1958 7 Sheets-Sheet 7

Inventor:
James B. Maher,
By Merriam, Lord
& Smith, Attys.

United States Patent Office 2,927,787
Patented Mar. 8, 1960

2,927,787
PRESSURE DOOR

James B. Maher, Chicago, Ill., assignor to Chicago Bridge and Iron Company, Chicago, Ill., a corporation of Illinois Application June 12, 1958, Serial No. 741,671

30 Claims. (Cl. 268—16)

This invention relates to a pressure door and locking mechanism which is suitable for use in pressure vessels such as retorts, autoclaves, airlocks and nuclear reactor containment vessels. It is particularly well adapted for use as a pressure door at either end of an emergency escape or personnel lock in a nuclear reactor containment vessel.

Pressure doors of conventional design have exhibited characteristics which limited their usefulness in situations where operating requirements were quite rigorous, and the unique features of this invention give it operating characteristics far superior to doors of more conventional design.

While it should be understood that this invention can be utilized in any number of different types of pressure vessels, it will be described primarily in conjunction with its use as a pressure door in an emergency escape lock for a nuclear reactor containment vessel because such use presents perhaps the most demanding operating requirements imposed upon any pressure door.

The purpose of an emergency escape lock in a nuclear reactor containment vessel is to provide a means for the escape of personnel who may happen to be inside the containment vessel when an emergency evacuation of personnal is necessary due to the occurrence of a nuclear accident or incident within the reactor. At such a time, the safety of the operating personnel who are within the containment vessel depends upon their ability to get out of the vessel in a minimum length of time without destroying the integrity of the vessel for containing radioactive substances which may be released on account of the nuclear accident. As an example, such operating personnel may have only from 15 to 20 seconds in which to make good their escape. During that period of time the pressure within the containment vessel may be rising from atmospheric pressure to as high as 30 or 35 p.s.i. above atmospheric, with accompanying increases in temperature. At the time of the emergency there may be a complete failure of electric and auxiliary power supply, and the escape door must therefore be capable of manual operation. In addition, it is imperative, from the standpoint of safety of the local population, that no appreciable quantities of radioactive substances escape from the containment vessel. For these reasons, among others, an emergency escape lock, rather than merely an escape door, is usually provided in nuclear power reactor containment vessels. Such a lock usually comprises a compartment which penetrates the shell of the vessel, with bulkheads at each end of the compartment, and with pressure doors mounted in the bulkheads to permit entrance to and egress from the escape lock.

The doors mounted in the bulkheads at either end of the compartment are usually so mounted as to open toward the pressure, and when seated must be capable of resisting pressure of the order of 30 or 40 p.s.i. Because of the emergency nature of the use of the escape lock, such doors must be fast operating. If power fails, these doors must be capable of being operated easily by hand. This requires that the door mechanisms be free from excessive frictional forces and also free from major gravitational forces. The emergency nature of the operation of the doors also requires that a single mechanical device, such as a lever or hand wheel, can perform in rapid sequence all the various steps required in the operation of the doors. These steps include the opening of a valve in the door or bulkhead which equalizes the pressures on the opposing faces of the door, unlocking the door, unseating the door and swinging the door open. After the personnel have passed through the door, a similar lever or hand wheel located inside the lock must be capable of taking the door through the same steps in the opposite sequence, such that the door is closed, locked and seated and the equalizing valve closed, before the door at the exit end of the lock is operated, permitting the personnel to pass from the lock to the outside air.

Doors of conventional design fail to meet the difficult operating requirements outlined above. Some such doors were either too heavy or presented too much friction to be operated manually. Others were too slow in their operation. Others required the performance of multiple manual operations which cannot be reasonably expected of a person under the stress of an occurring nuclear accident. Heretofore, all known escape doors which met the ease of operation requirements described above were necessarily restricted to small sizes, which caused other problems such as the limitation of passage clearances, necessity of crawling and manipulating the controls from awkward crouching positions, and the attendant lengthening of pass-through time.

Pressure doors employing the features of this invention have been successfully built to go through a complete sequence of operations, either in opening or closing, by a one-quarter revolution of a hand lever powered by a person of modest proportions and strength in a period of approximately two seconds. This ease and speed of operation is made possible because the door is hung in a balanced position unaffected by gravitational forces, has operating parts which roll rather than slide against each other, and has a unique cam and roller follower locking, seating, unseating and unlocking arrangement. Other similar doors have been built and have successfully operated on the bases of lever rotations of 120 degrees and 180 degrees, thus further reducing the amount of force necessary to operate the doors. The degree of lever movement depends upon such factors as the mass of the door, the resiliency of the seal gasket and the size of the equalizing valve.

This door is peculiarly well adapted for use with an interlocking device which makes it impossible for the door at one end of the lock to be opened while the door at the other end is also open, but permits both doors to be closed or opened from outside either end of the lock or from inside the lock. It should be understood, however, that the door may be used equally well without such an interlocking device.

The invention will be further described by referring to the drawings, in which:

Figure 1 illustrates in a perspective view one embodiment of this invention wherein a rack and pinion gear arrangement is used to effect the rotation of the locking ring.

Figure 4 is a side view of an airlock having installed in the ends thereof the pressure doors of this invention. A portion of the side wall of the airlock is cut away to illustrate the interlocking system employed to control the opening and closing of the pressure doors.

Figure 5 is a cross sectional view along line 5—5 of Figure 2 showing a roller mount portion of a locking ring with the guide rollers and cam rollers attached thereto.

Figure 6 is a fragmentary view along line 6—6 of Figure 5 of a roller mount portion of a locking ring showing the relationship of the cam rollers to the door cam when the door is closed.

Figures 7 and 8 are partial views of the locking ring presented in Figure 6 showing only the cam roller and cam arrangement and illustrating the progressive action of the cam rollers along the door cam during the opening of the equalizing valve and unseating and unlocking of the door.

Figure 9 is a view of a Geneva mechanism employed as a mechanical timer for controlling the sequence of operation of several of the phases during the door opening and closing sequences.

Figure 10 is a perspective view of an embodiment of this invention showing the chain operated cam roller and door cam system utilized in connection with rectangular shaped doors.

Figures 13 and 14 are, respectively, cross sectional views of the gasket and seating arrangement utilized in this invention when only nominal pressure is exerted against the door and when substantial pressure is exerted against the door.

Throughout this specification reference is frequently made to "opening" or "closing" the door, and it should be understood that, unless the context clearly indicates a more limited meaning, these terms include all those steps necessary to effect the complete operation, such as pressure equalization, unseating and unlocking, and swinging the door open.

Figure 2:
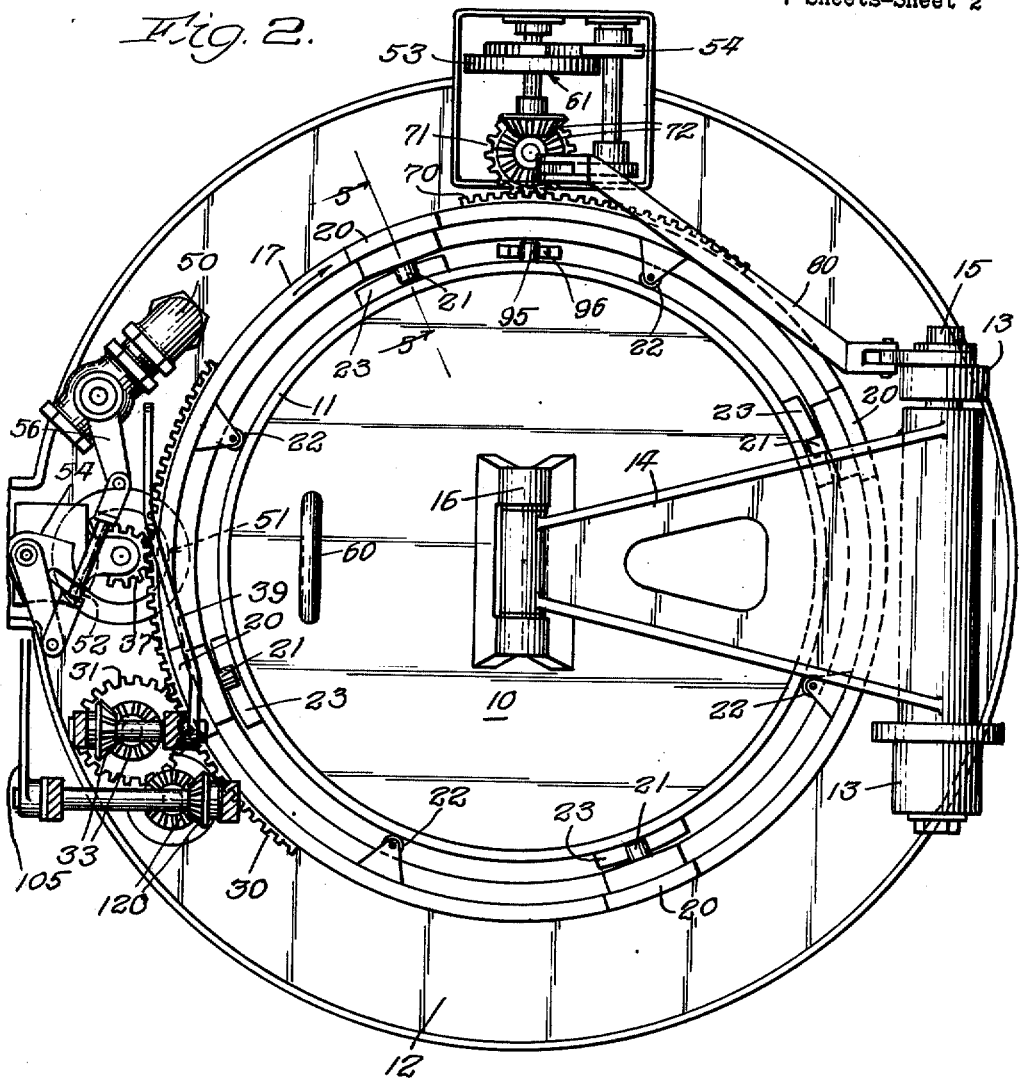
Figure 2 is a front elevation view of the door mechanism shown perspectively in Figure 1.

Referring now to Figures 1, 2 and 5, a circular door 10 having peripheral flange 11 depending therefrom, is hinged to bulkhead 12, by means of frame hinge supports 13 which are connected to bulkhead 12, said supports functioning as bearings to receive axle 15 to which frame 14 is integrally affixed, preferably by means of adjusting bolts to accommodate small variations in alignment. The end of frame 14 is connected to door hinge bearing 16 which is fastened to door 10 so as to permit the swiveling of door 10 about a vertical axis in frame 14 and door hinge bearing 16. Frame 14, being joined to axle 15, also rotates with its movement. It is important in installing frame hinge supports 13 that they be in truly vertical alignment. If this is not done, then the weight of the door will cause it either to tend to swing shut or to swing open, while with the axle 15 in true vertical position the weight of the door 10 has no such effect and will swing freely.

Rotating locking ring 17 is mounted on guide rail 18 which is attached to neck flange 24 depending from bulkhead 12. Ring 17 is adapted to move concentrically about door 10. Locking ring 17 is guided by means of a plurality of pairs of guide rollers 19 which are fitted on suitable axles to the bulkhead side of the roller mounts 20 which depend laterally at spaced intervals from each side of ring 17. The pairs of guide rollers are mounted astride guide rail 18. Support rollers 22 attached to locking ring 17 ride on the outer peripheral surface of face flange 26 of neck flange 24 to maintain the bottom faces of guide rollers 19 and cam rollers 21 in spaced relationship from the adjacent neck flange 24.

Cam rollers 21 are mounted on suitable axles to the door side of roller mounts 20 opposed to guide rollers 19. Cam rollers 21 co-operate with the surface of cams 23 which are spaced apart in alignment on the outer periphery of door flange 11. Cams 23, as shown in Figures 6–8, are provided with a straight portion 23a and an oblique portion 23b which are employed in initially unseating the door in the sequence of operations utilized in opening the door or seating the door in the door closing sequence.

Various mechanical arrangements can be utilized in rotating locking ring 17. For example in Figure 1, a rack and pinion gear mechanism is used. Rack 30 is installed on the outer surface of locking ring 17 adjacent pinion gear 31 which is keyed to drive shaft 32 operated by gear box 33. Manipulation of operating lever 34 effects the rotation of pinion gear 31 which engages rack 30 to provide for the rotation of locking ring 17. The gearing is selected to provide a gear train which will permit the opening of door 10 with a minimum angular displacement of lever 34, e.g. 90°–180°.

Figure 3:
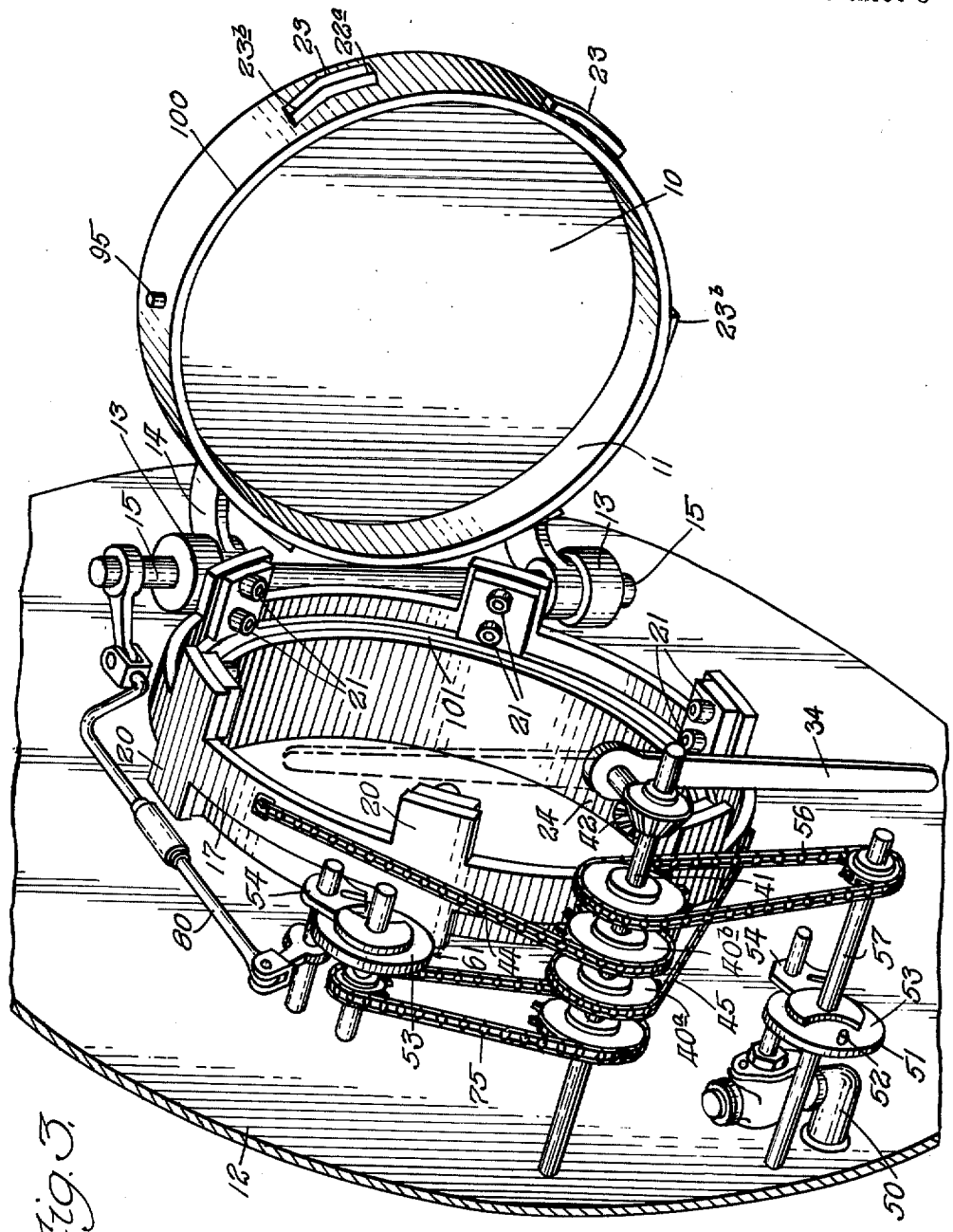
Figure 3 is a perspective view of an alternative embodiment of this invention wherein the rotation of the locking ring is effected by means of a chain and sprocket drive.

Locking ring 17 can also be rotated by means of a gear, sprocket and chain arrangement employed in the bulkhead assembly shown in Figure 3. In its general construction this assembly is the same as that illustrated in Figure 1. Accordingly the same corresponding element designations are employed. Sprockets 40a and 40b are operated by means of drive shaft 41 which is driven by gear box 42 and handle 43. The rotation of sprockets 40a and 40b actuates chains 44 and 45, the terminal ends of which are fastened to locking ring 17 and sprockets 40a and 40b, respectively, so as to rotate locking ring 17 about neck flange 24 in either a clockwise or a counter-clockwise direction, as may be desired.

In the operation of the door assembly shown in Figures 1 and 3, the initial rotation of locking ring 17 has no direct effect in opening the door because during this phase of the door opening sequence cam rollers 21 are riding along the straight portion 23a of cams 23. This phase of the cycle is employed to effect a pressure equalization by opening valve 50. A mechanical timing device is necessary to co-ordinate this action and the door swinging phase with the remaining phases of the door opening cycle. Although in the illustrated assemblies a Geneva mechanism 51, shown apart from the combination in Figure 9, is utilized, other equivalent timing devices can be employed. In this mechanism cam boss 52, mounted on disc 53, upon rotation engages slotted cam follower 54 which is keyed to an operating shaft 54a which controls, in the instance of the pressure equalizer, the positioning of the plug element of valve 50 by means of linkage 56. Rotations of shaft 55 will produce rotation of cam follower 54 only at such time as boss 52 engages cam follower 54. Thus in Figure 9 out of 360° rotation of shaft 55, only a 90° portion of such rotation actuates follower 54. A similar mechanism 61 is also used to time the swinging of the door after the cam rollers have moved out of engagement with the cams.

In the rack and pinion gear arrangement employed to rotate locking ring 17 in the embodiment shown in Figure 1 a second pinion gear 57 enmeshes with rack 30 to provide for the rotation of drive shaft 55 which turns disc 53 of the Geneva mechanism.

A chain and sprocket drive 56 is used in the chain drive arrangement shown in Figure 3 to control the operation of valve 50 by means of the Geneva mechanism 51. In this instance sprocket drive 56 which rotates drive shaft 57 is operated by hand lever 43 which drives shaft 41. Drive shaft 57 being keyed to disc 53 of the Geneva mechanism effects the operation thereof.

After plug valve 50 has been opened, with continued rotation of the gear box drive shaft 32 in Figure 1, and 41 in Figure 3, locking ring 17 rotates to bring cam rollers 21 into engagement with the oblique portion 23b of cam 23. Continued rotation of locking ring 17 causes a force to be exerted against cam 23 which unseats door 10 and urges it open. With ring 17 being rotated to bring cam rollers 21 out of engagement with cams 23, door 10 is unlocked and can be swung open on its hinges. At this phase of the sequence door 10, which is "free wheeling" can be pulled open manually by handle 60 on door 10 or remotely by continued operation of the operating handle or lever 34 or 43. As pointed out above, the latter operation entails the co-operation of a second mechanical timer, e.g. Geneva mechanism 61 which has been previously described. This mechanism is mechanically linked to axle 15 of the door hinge mechanism to effect its rotation.

In Figure 1 the timer is operated by a rack 70 and pinion gear 71 drive. Gear box 72 is driven by pinion gear 71 which in turn is rotated by the movement of rack 70 mounted on rotating ring 17. If a Geneva mechanism as illustrated in Figure 9 is used, cam boss 52 is mounted on disc 53 so as to engage slotted cam follower 54 at the proper time in the sequence.

In Figure 3 a chain and sprocket drive 75 is used to operate timer 61.

In either instance a mechanical linkage 80 operated by the rotation of slotted cam follower 54 rotates axle 15 and frame 14 so as to swing door 10 either towards or away from bulkhead 12.

The sequence of a door opening operation commencing with the door locked, seated and with pressure acting against the near surface, is described step by step as follows with reference to Figures 1 and 4.

(a) A person desiring to pass through the door will pull the lever 34 which rotates pinion gear 31 which in cooperation with rack 30 moves locking ring 17 counterclockwise, and the first portion of such rotation causes pressure equalizing valve 50 to open. During this portion of movement, cam rollers 21 attached to locking ring 17 travel from the seated and pressurized position as shown in Figure 6 to the seated and unpressurized position as shown in Figure 7. Up to this point there has been no change in forces interacting between either cam rollers 21 and cam 23, and hence no change in the position of door 10 which remains sealed.

(b) Continued rotation of locking ring 17 brings cam rollers 21 into contact with the machined oblique surfaces 23b of cam 23, and as the movement continues cam rollers 21 force cam 23 in a direction away from the door opening. Since cam 23 is attached to flange 11 of door 10, the pressure of cam rollers 21 against face 23b causes the door 10 to be unseated. Near the end of this portion of the movement the relationship of cam rollers 21 to cam 23 is as shown in Figure 8.

(c) As rotation continues, locking ring 17 continues its movement so as to disengage completely cam 23 from cam rollers 21, at which point the door is unlocked. Further rotation actuates the linkage 80 by means of the Geneva mechanism 61 and swings the door open.

After the person opening the door has passed through it, he then operates hand lever 90 located within the airlock compartment shown in Figure 4. Lever 90 controls gear box 91 which also operates drive shaft 32 controlling the rotation of locking ring 17. Such movement of lever 90 through its full operating arc produces the following door closing sequence.

(a) Linkage 80 swings door 10 closed. Door 10 is guided into position by means of pin 95 which is mounted on flange 11. Pin 95 engages slotted guide plate 96 which is secured to neck flange 24.

(b) Rotation of locking ring 17 moves cam rollers 21 into engagement with cam 23 thus locking the door closed.

(c) Further rotation of locking ring 17 causes cam rollers 21 to bear against oblique machined cam face 23b forcing the door to seat against the gasket 101 in the door opening in the bulkhead. At the end of this portion of movement, the relationship of cam rollers 21 to door cam 23 is as shown in Figure 7.

(d) Continued rotation of locking ring 17 causes cam rollers 21 to continue moving in relationship to cam 23 and at the same time closes equalizing valve 50. At the end of the door closing operation the relationship of cam rollers 21 to door cam 23 is as shown in Figure 6.

Ordinarily a gasket forms the sealing and bearing surface between the door and the bulkhead. A relatively hard rubberlike gasket, i.e. one which, while flexible and compressible, has a relatively small deflection at relatively high loads with good resistance to permanent set, such as neoprene (a synthetic rubber marketed by E. I. du Pont) or silicone rubber or other similar materials, is required in order to withstand the substantial pressures and temperatures to which it is subjected. For example, the gaskets employed in locks used in nuclear reactor containment vessels have been selected to produce a durometer reading of 40. A soft, spongelike gasket is completely unsuitable. For this reason it is necessary to apply seating and unseating forces of comparatively high magnitude, and it has been found that the use of a cam and double roller follower, as shown in the figures and described herein, provides sufficient force for seating and unseating without requiring a power assist to hand operations or, in the alternative, excessive gearing down. The locking mechanism is generally designed to force the door tongue into the gasket a distance sufficient to produce a tight seal against a lock pressure of 2 p.s.i.g. internal or external. Since a higher pressure in the vessel will produce a much larger gasket seating load than that required to seal the door, it is necessary to provide space between roller followers 21 greater than the width of portion 23a of cam 23 and also to provide stops 103, shown in Figure 5, which are peripherally spaced on door flange 11 to limit the penetration of sealing ring 100 into gasket 101 under high pressure and temperature.

As pressure builds up against door 10, it moves toward the bulkhead, compressing the gasket between door and bulkhead. This is schematically illustrated in Figure 5 which illustrates the relation between beaded sealing ring 100 on door 10 and gasket 101 positioned in face flange 26 attached to neck flange 24. It is to be noted that the sides of sealing ring 100 are spaced from the side walls of groove 102 in order to permit the gasket to be extruded upon compression of the gasket and that, in this compressed position, neither face of cam 23 is bearing against a roller.

The gasket and seat are shown in greater detail in Figures 13 and 14. The width of the gasket is selected to be approximately ¼ inch greater than the width of the corresponding door seating flange face. A small semi-cylindrical bead, having a radius of approximately one-eighth the width of the face, projects outwardly from the face a total distance of about one-fourth the width of the face. When the door is seated and locked, but only nominal pressure is acting against it, the bead needs only to be slightly depressed into the gasket in order to effect a fluid tight seal. Thus the amount of force necessary to accomplish initial low pressure sealing is kept to a minimum. When substantial pressure, with or without a corresponding increase in temperature, commences to act against the door, the door is forced toward the gasket and the bead depresses into the gasket until the entire flange face is in contact with the gasket, thus maintaining the fluid tight characteristic even against such higher pressures. If a temperature rise accompanies the pressure increase, then the gasket material becomes somewhat more fluid and is susceptible to extrusion. Because the flange face is slightly narrower than the gasket, its corners depress into the gasket surface at points near the gasket groove walls, thus permitting only small "ears" of gasket material to be extruded and, as shown in Figure 14, provides a long and tortuous leakage barrier between flange face and gasket surface. In the illustrative embodiments the resilient gasket is installed in the face of the neck flange affixed to the bulkhead and the sealing bead is mounted on the face of the door flange, If desired, however, this arrangement can be reversed and the gasket installed on the door and the sealing bead affixed to the neck flange.

Experimentation has proved a personnel escape door, designed and built in accordance with the principles described above, can be opened and closed with ease by a small person pulling a hand lever through a turn of approximately 90 degrees. It should be noted that, during each step in the opening and closing sequences, virtually the entire power applied to the operating lever is utilized in the operation of a different portion of the mechanism. In other words, while the equalizing valve is being opened or closed no power is wasted on the locking, seating or door swinging steps; similarly, when the door is being seated or unseated there is no waste of power in operating the valve or the swinging mechanism.

It should also be noted that friction in this mechanism is minimized by the elimination of all sliding contact surfaces. Most so-called "quick opening" doors of conventional design employ a plurality of cam pairs in which locking and seating are accomplished by the sliding of one cam surface against another cam surface and many of them also require rotation of the door itself. Because of the magnitude of the forces transmitted between sliding cam surfaces, the frictional forces inherent in such a device make it necessary to provide an external source of power in order to operate the door, or else to gear an operating hand wheel down to such an extent that as many as 20 or 30 turns of the hand wheel are required in order to open or close a door.

In addition, it should be noted that, if the adjustable supports 13 and shaft 15 are carefully located in exact vertical alignment, the weight of the door has no effect upon the opening or closing of the door except, of course, for the inertia of its mass. Furthermore, the mounting arrangement is such as to permit unrestrained seating of all portions of the door against its corresponding bearing surface in the bulkhead, so that the pressure exerted against the bearing surface is essentially uniform throughout the circumference of the door and there are no substantial concentrations of force against any particular circumferential portions.

In airlocks such as that shown in Figure 4 which employ the pressure doors of this invention as closures for the terminal ends thereof, an interlock system 113 shown schematically in Figures 1 and 4 is provided in order to insure that a fluid-tight integrity is maintained in the vessel penetrated by the airlock. Door opening control mechanisms are provided so that each door can be operated from either side of the bulkhead in which it is placed. These doors, however, are mechanically interlocked so that both doors cannot be opened at the same time and one door cannot be opened unless the opposite door is sealed.

If the exterior door were inadvertently left in open position, interlock 113 would be engaged. Thus, the interior door operating levers 34 and 90 could not be operated. It will be noted that in addition to operating lever 34 an additional operating lever 105 is provided in the interior bulkhead for emergency and will perform the four operations on the exterior door. If the exterior door is open at a time when quick exit from the containment vessel is necessary, it can be swung shut on its hinges, the door and valve sealed, and the interlock returned to a position which will allow operation of the interior door. With this feature, personnel in the vessel are protected against the possibility of being locked in.

In the illustrative embodiment in Figure 4 a typical airlock penetrating the wall of a containment vessel is shown. Each door assembly employed in the illustrative airlock is substantially identical in construction. Accordingly, to simplify the discussion of this invention no detailed description of the interior door assembly 110 or the exterior door assembly 111 will be given as they are the same as the door assembly shown in Figure 1 hereinbefore considered. Drive shaft 32 which is driven by gear box 33 and controlled by lever 34 continues through end bulkhead 12 of the airlock. At the other end of the shaft is provided gear box 91 which is controlled by operating lever 90. Keyed to drive shaft 32 is circular disc 113 which is provided with a cut-out arcuate segment 114 which has the same radius as disc 115. Extending through the interior of the airlock and penetrating bulkheads 12 and 116 positioned at either end, is drive shaft 117. Drive shaft 117, which is operated by gear boxes 118, 119 and 120, is used to operate pressure door assembly 111 positioned at the exterior end of the airlock. Circular disc 115 which is provided with an arcuate cut-out portion 123 having the same radius as disc 113 is keyed on drive shaft 117 in a position coplanar with circular disc 113. Circular discs 113 and 115 in this illustrative embodiment have identical configurations with the cut-out segments so positioned that drive shafts 32 and 117 cannot be operated at the same time. With both pressure doors 110 and 111 being closed, the cut-out segments 114 and 123 are positioned face to face in order to permit either of the doors to be opened by the several control means placed within the lock or positioned on the bulkheads on the outer faces of the lock. Once, however, one disc is rotated by the drive shaft to which it is fitted and engages the cut-out portion of the other disc the latter cannot be inadvertently rotated which effectively locks the drive shaft to which it is fitted. To operate the exterior door, levers 121 and 122 are provided which control the operation of shaft 117 by gear boxes 118 and 119 respectively.

The size and design of the compartment of the airlock will depend upon its use as an equipment, personnel, or emergency airlock, and can be either spherical, multispherical, or tubular. It will also be required in certain installations to utilize other than circular pressure door shapes.

Figure 11:
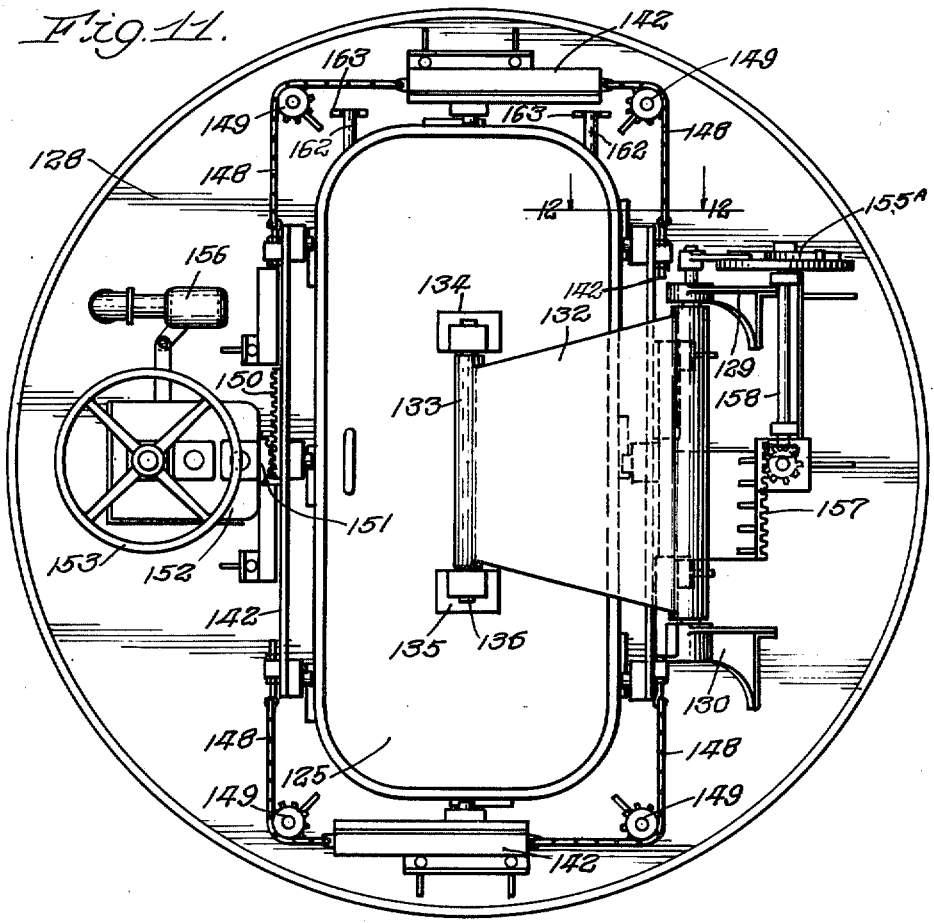
Figure 11 is a front elevation view of the door assembly illustrated in Figure 10.
Figure 12:
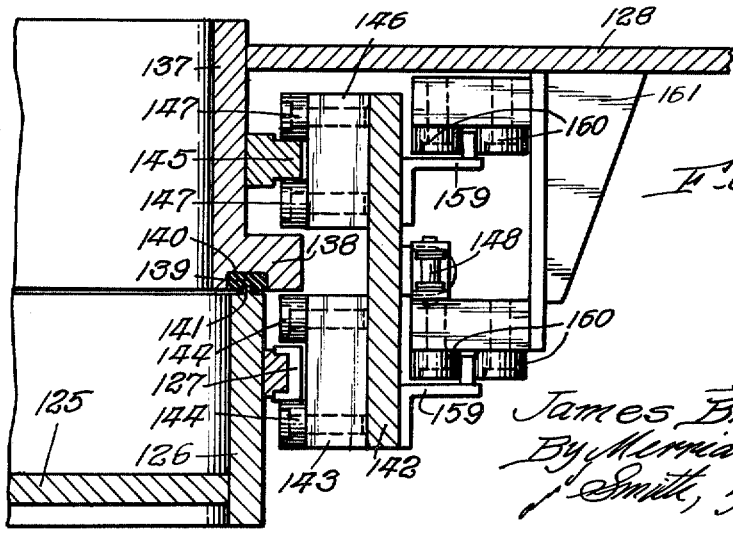
Figure 12 illustrates the locking bar arrangement used to operate the cam rollers which engage the door cams employed in the door assembly of Figure 10.

Figures 10–12 show an alternate embodiment of the invention wherein the pressure door is generally rectangular with rounded corners. Because of this configuration, it is no longer possible to use a circular locking ring such as that employed in the aforementioned assemblies.

Referring to these drawings it will be seen that the pressure door and bulkhead assembly consists of a rectangular door 125 having a peripheral flange 126. Spaced in alignment on the periphery of flange 126 are a plurality of aligned door cams 127 having a straight portion and an oblique inwardly directed portion as hereinbefore described. Door 125 is hinged to bulkhead 128 by means of hinge supports 129 and 130 with axle 131 journaled therein. Frame 132 is pivotally mounted on axle 131 and interconnects door 125 therewith by means of pivotal mounting 133. Pivotal mounting 133 comprises a pair of bearing supports 134 and 135 in which is mounted axle 136 upon which door frame 132 pivots. Depending outwardly from bulkhead 128 is neck flange 137 which surrounds an opening provided in bulkhead 128. The extremity of neck flange 137 is provided with a face flange 138 in which is mounted a resilient gasket 139 inserted in groove 140 provided in face flange 138. Door 125 has a beaded peripheral flange 141 on the face thereof which engages gasket 139 to enclose the opening provided in bulkhead 128 and provides a fluid-tight seal between door 125 and neck flange 137. In order to effect the door opening and closing sequence hereinbefore discussed, a plurality of locking bars 142 are peripherally mounted along each side of the rectangular neck flange 137 in spaced relation therefrom. Mounted on the locking bars 142 are a plurality of cam roller mounts 143. A pair of cam rollers 144 are fitted to cam roller mounts 143 on suitable axles. A pair of cam rollers 144 straddle each of door cams 127 and co-operate therewith in the manner hereinbefore described. To permit the proper movement of locking bars 142 aligned guide rails 145 are provided on the outer surface of neck flange 137. On locking bars 142 opposed to cam roller mounts are installed guide roller mounts 146 upon which are fitted pairs of guide rollers 147 on suitable axles. Each of the pairs of guide rollers 147 co-operate with guide rails 145 to provide the proper movement of locking bars 142. Each of locking bars 142 is interconnected by a flexible linkage 148 which permits all of the locking bars 142 to be moved as a unit. The change in direction required for the movement of flexible linkage 148 is provided by sheaves 149 which are rotatably mounted on bulkhead 128. To effect the movement of the locking bars a drive mechanism such as rack 150 and pinion gear 151 is provided. Pinion gear 151 is driven by a suitable gear train 152 operated by means of hand wheel 153 which effects the rotation of shaft 154. As in the hereinbefore described door assembly, mechanical timers such as Geneva mechanisms 155 and 155a are used to control the various phases of the door opening and closing sequences such as the operation of pressure equalizing valve 156 and the rotation of axle 131 which controls the swinging of door 125. The Geneva mechanism 155a which controls the swinging of door 125 is operated by means of a rack and pinion gear movement 157 which rotates drive shaft 158 which is connected to the Geneva mechanism 155a employed during the door swinging sequence.

To guide the movement of locking bars 142 a mounting means such as that shown in Figure 12 is employed for the vertical locking bars. In this instance angle guides 159 slide between roller guide pairs 160 which are rotatably mounted to a suitable bracket 161 affixed to bulkhead 128. A similar arrangement is also employed for the horizontal locking bars. Door 125 is guided into a closed position by means of pins 162 which are affixed to peripheral flange 126 of door 125 and engage slotted guides 163 fastened to bulkhead 128. In its operation the rectangular door illustrated in Figures 10 and 11 employs the same sequence of door opening and closing operations previously described.

Although the instant invention has been illustrated by manually operated control mechanisms, it is apparent that electrically operated or hydraulic systems can be used which will perform all the operations accomplished by the hand levers or supplement the door swinging phase of the sequence. Electrically powered systems are especially effective for the operation of airlock or other pressure door installations during normal service. Emergency installations should, however, be manually controlled to permit operation in the event of power failure. In addition signal systems can be provided to indicate the various conditions of the door assemblies employed in an airlock compartment and show door and valve orientations relative to operating lever travel.

In fabricating the various elements of this invention, conventional methods and materials of construction can be employed. To facilitate the pictorial presentation of this invention various bearing and journal arrangements for rigidly mounting the various operating shafts have not been shown. Also the penetration of the shafts through the bulkheads, where necessary, should be made with a fluid tight seal. Such expedients however are apparent and do not go to the essence of this invention.

While several embodiments of the invention have been shown and described, it should be clearly understood that the invention is not limited to the particular embodiments shown, but is to be construed broadly in accordance with the appended claims.

I claim:

1. In combination with a bulkhead provided with a door opening having a first sealing means circumscribing said opening, a pressure door comprising a door member hinged to said bulkhead and enclosing said door opening, a second sealing means mounted on the face of said door member cooperating with said first sealing means whereby a fluid-tight seal is provided between said bulkhead and said door, a peripheral flange surrounding said door member, a plurality of cams mounted in aligned, spaced relation on said flange, each of said cams having a straight portion and an oblique portion, said oblique portion being inwardly diverted toward said bulkhead, a plurality of cam roller mounts movably fitted on guides affixed to said bulkhead and spaced apart from said peripheral flange, a pair of rotatable cam rollers mounted on each of said mounts in an astraddle alignment with said cams, and means for moving said cam roller mounts co-extensively along said cams whereby said cam rollers engage the oblique portion of said cams and urge said door member respectively into seating and unseating relationship with respect to said door opening and said cam rollers are moved out of engagement with said cams whereby said door member can be swung on its hinge.

2. In combination with a vertical bulkhead provided with a circular door opening having a first sealing means circumscribing said opening, a circular pressure door hinged to said bulkhead and enclosing said door opening, a second sealing means mounted on the face of said door member cooperating with said first sealing means whereby a fluid-tight seal is provided between said bulkhead and said door, a peripheral flange surrounding said door member, a plurality of cams mounted in an aligned, spaced relation on said flange, each of said cams having an oblique portion inwardly diverted toward said bulkhead, a circular locking ring concentric with and spaced from said peripheral flange, a plurality of roller mounts transversely mounted on said locking ring to provide a roller mounting area laterally depending from each side of said ring, a pair of rotatable cam rollers mounted on the door-side mounting area in an astraddle alignment with said cams, a circular guide rail depending from said bulkhead, a pair of rotatable guide rollers mounted on the bulkhead-side area astride said guide rail, and means for rotating said locking ring whereby said cam rollers move coextensively with said cams to engage the oblique portion of said cams and urge said door member respectively into seating and unseating relationship with respect to said door member and said cam rollers are moved out of engagement with said cams whereby said door member can be swung on its hinge.

3. In a combination in accordance with claim 2 in which the means for rotating said locking ring comprises a drive shaft, a pinion gear affixed to said shaft, a rack attached to said locking ring and meshing with said pinion, and means rotating said drive shaft.

4. In a combination in accordance with claim 2 in which means for rotating said locking ring comprises a drive shaft, a sprocket affixed to said drive shaft, a linked chain attached to said locking ring and engaging said sprocket, and means for rotating said drive shaft.

5. In combination with a vertical bulkhead provided with a rectangular door opening having a first sealing means encompassing said opening, a rectangular pressure door hinged to said bulkhead and enclosing said door opening, a second sealing means mounted on the face of said door member cooperating with said first sealing means whereby a fluid-tight seal is provided between said bulkhead and said door, a peripheral flange surrounding said door member, a plurality of cams mounted in aligned, spaced relation on said flange, each of said cams having an oblique portion, said oblique portion being inwardly diverted toward said bulkhead, a plurality of cam roller-mount bars positioned along the sides of said peripheral flange and spaced therefrom, said bars being joined by flexible linking means and adapted to move parallel with the flange portion of the door adjacent each of said bars, guide means cooperating with said bars attached to said bulkhead, a plurality of cam roller mounts attached to said bars to provide cam roller mounting areas laterally depending from said bars, a pair of rotatable cam rollers mounted on said roller mounts in an astraddle alignment with said cams, and means for positioning said cam roller-mount bars along the adjacent peripheral flange portion of said door member; whereby said cam rollers move coextensively with said cams to engage the oblique portion of said cams and urge said door member respectively into seating and unseating relationship with respect to said door member and said cam rollers are moved out of engagement with said cams whereby said door member can be swung on its hinge.

6. In combination with a vertical bulkhead provided with a rectangular door opening having a first sealing means encompassing said opening, a rectangular pressure door hinged to said bulkhead and enclosing said door opening, a second sealing means mounted on the face of said door member cooperating with said first sealing means whereby a fluid-tight seal is provided between said bulkhead and said door, a peripheral flange surrounding said door member, a plurality of cams mounted in aligned, spaced relation on said flange, each of said cams having an oblique portion, said oblique portion being inwardly diverted toward said bulkhead, a plurality of roller-mount bars positioned along the sides of said peripheral flange and spaced therefrom, said bars being joined by flexible linking means and adapted to move parallel with the flange portion of the door adjacent each of said bars, guide rails attached to said bulkhead, a plurality of roller mounts transversely attached to said bars to provide roller mounting areas laterally depending from each side of said bars, a pair of rotatable cam rollers mounted on the door-side mounting area of each of said roller mounts in an astraddle alignment with said cams, guide rails depending from said bulkhead, a pair of rotatable guide rollers mounted on the bulkhead-side, mounting area astride said guide rail and means for positioning said roller-mount bars along the adjacent peripheral flange portion of said door member, whereby said cam rollers move coextensively with said cams to engage the oblique portions of said cams and urge said door member respectively into seating and unseating relationship with respect to said door member and said cam rollers are moved out of engagement with said cams whereby said door member can be swung on its hinge.

7. In combination with a vertical bulkhead provided with a door opening having a first sealing means circumscribing said opening and provided with an opening controlled by a valve means whereby the pressure on either side of said bulkhead can be equalized, a pressure door comprising a door member hinged to said bulkhead and enclosing said door opening, a second sealing means mounted on the face of said door member cooperating with said first sealing means whereby a fluid-tight seal is provided between said bulkhead and said door, a peripheral flange surrounding said door member, a plurality of cams mounted in aligned, spaced relation on said flange, each of said cams having a straight portion and an oblique portion, said oblique portion being inwardly diverted toward said bulkhead, a plurality of cam roller mounts slidably fitted on guides affixed to said bulkhead and spaced apart from said peripheral flange, a pair of rotatable cam rollers mounted on each of said mounts in an astraddle alignment with said cams, and means for moving said cam roller mounts coextensively along said cams whereby said cam rollers engage the oblique portion of said cams and urge said door member respectively into seating and unseating relationship with respect to said door opening and said cam rollers are moved out of engagement with said cams whereby said door member can be swung on its hinge, said combination having means for sequentially opening said valve means, unseating and unlocking said door, and swinging said door open.

8. In combination with a vertical bulkhead provided with a circular door opening having a first sealing means circumscribing said opening and provided with an opening controlled by a valve means whereby the pressure on either side of said bulkhead can be equalized, a circular pressure door hinged to said bulkhead and enclosing said door opening, a second sealing means mounted on the face of said door member cooperating with said first sealing means whereby a fluid-tight seal is provided between said bulkhead and said door, a peripheral flange surrounding said door member, a plurality of cams mounted in an aligned, spaced relation on said flange, each of said cams having an oblique portion inwardly diverted toward said bulkhead, a circular locking ring concentric with and spaced from said peripheral flange, a plurality of roller mounts transversely mounted on said locking ring to provide a roller mounting area laterally depending from each side of said ring, a pair of rotatable cam rollers mounted on the door-side mounting area in an astraddle alignment with said cams, a circular guide rail depending from said bulkhead, a pair of rotatable guide rollers mounted on the bulkhead-side mounting area astride said guide rail, and means for rotating said locking ring whereby said cam rollers move coextensively with said cams to engage the oblique portion of said cams and urge said door member respectively into seating and unseating relationship with respect to said door member and said cam rollers are moved out of engagement with said cams whereby said door member can be swung on its hinge, said combination having means for sequentially opening said valve control means, unsealing and unlocking said door member and swinging said door open.

9. In a combination in accordance with claim 8 in which the means for rotating said locking ring comprises a drive shaft, a pinion gear affixed to said shaft, a rack attached to said locking ring and meshing with said pinion, and means for rotating said drive shaft.

10. In a combination in accordance with claim 8 in which means for rotating said locking ring comprises a drive shaft, a sprocket affixed to said drive shaft, a linked chain attached to said locking ring and engaging said sprocket, and means for rotating said drive shaft.

11. In combination with a vertical bulkhead provided with a door opening having a first sealing means circumscribing said opening and provided with an opening controlled by a valve means whereby the pressure on either side of said bulkhead can be equalized, a rectangular pressure door hinged to said bulkhead and enclosing said door opening, a second sealing means mounted on the face of said door member cooperating with said first sealing means whereby a fluid-tight seal is provided between said bulkhead and said door, a peripheral flange surrounding said door member, a plurality of cams mounted in aligned, spaced relation on said flange, each of said cams having an oblique portion, said oblique portion being inwardly diverted toward said bulkhead, a plurality of cam roller-mount bars positioned along the sides of said peripheral flange and spaced therefrom, said bars being joined by flexible linking means and adapted to move parallel with the flange portion of the door adjacent each of said bars, guide means cooperating with said bars attached to said bulkhead, a plurality of cam roller mounts attached to said bars to provide cam roller mounting areas laterally depending from said bars, a pair of rotatable cam rollers mounted on said roller mounts in an astraddle alignment with said cams, and means for positioning said cam roller mount bars along the adjacent peripheral flange portion of said door whereby said cam rollers move coextensively with said cams to engage the oblique portion of said cams and urge said door member respectively into seating and unseating relationship with respect to said door member and said cam rollers are moved out of engagement with said cams whereby said door member can be swung on its hinge, said combination having means for sequentially opening said valve means unsealing and unlocking, and swinging said door open.

12. In combination with a vertical bulkhead provided with a door opening having a resilient seating means circumscribing said opening and provided with an opening controlled by a valve means whereby the pressure on either side of said bulkhead can be equalized, a rectangular pressure door hinged to said bulkhead and enclosing said door opening, a sealing means projecting from the face of said door member cooperating with said seating means whereby a fluid-tight seal is provided between said bulkhead and said door, a peripheral flange surrounding said door member, a plurality of cams mounted in aligned, spaced relation on said flange, each of said cams having an oblique portion, said oblique portion being inwardly diverted toward said bulkhead, a plurality of roller-mount bars positioned along the sides of said peripheral flange and spaced therefrom, said bars being joined by flexible linking means and adapted to move parallel with the flange portion of the door adjacent each of said bars, guide rails attached to said bulkhead, a plurality of roller mounts transversely attached to said bars to provide roller mounting areas laterally depending from each side of said bars, a pair of rotatable cam rollers mounted on the door-side mounting area of each of said roller mounts in an astraddle alignment with said cams, guide rails depending from said bulkhead, a pair of rotatable guide rollers mounted on the bulkhead-side mounting area astride said guide rail and means for positioning said roller mount bars along the adjacent peripheral flange portion of said door member whereby said cam rollers move co-extensively with said cams to engage the oblique portion of said cams and urge said door member respectively into seating and unseating relationship with respect to said bulkhead and said cam rollers are moved out of engagement with said cams whereby said door member can be swung on its hinge, said combination having means for sequentially opening said valve means, unsealing and unlocking said door, and swinging said door open.

13. A bulkhead and pressure door assembly which comprises a bulkhead provided with an entrance way comprising a circular door opening and a circular neck flange encircling said door opening and having a flanged face, said face having a resilient seating means fitted therein and circumscribing said opening; a pressure equalizing means penetrating said bulkhead and being provided with a valve means; a pressure door comprising a door member registering with said flanged face to enclose said entrance way, a sealing means projecting from the face of said door member cooperating with said resilient seating means whereby a fluid-tight seal is provided between said bulkhead and said door, a hinge member pivotally fastening said door member to said bulkhead, a peripheral door flange surrounding said door member, a plurality of cams mounted in an aligned, spaced relation on said door flange, each of said cams having a straight portion and an oblique portion, said oblique portion being inwardly diverted toward said bulkhead, a rotatable locking ring concentric with said neck flange and door flange, roller means mounted on the inside face of said locking ring and engaging the outside of said flanged face whereby said ring is spaced apart from said neck flange and door flange, a plurality of roller mounts transversely affixed to said locking ring to provide roller mounting areas laterally depending from each side of said ring, a pair of rotatable cam rollers mounted on the door side of the roller mounting areas in astraddle alignment with said cams, a circular guide rail encircling said neck flange intermediate the bulkhead and flanged face, a pair of rotatable guide rollers mounted on the bulkhed side of the roller mounting areas astride said guide rail, and a rotating means for angularly displacing said locking ring whereby said cam rollers engage the oblique portion of said cams and urge said door member respectively into seating and unseating relationship with respect to said door opening, and said cam rollers can be moved in and out of engagement with said cams and said door member can be swung on said hinge member said rotating means comprising a drive shaft, a first pinion gear secured to said drive shaft, a first rack affixed to said locking ring and meshing with said pinion, and means including a gear box for rotating said shaft, a second pinion gear enmeshing with said first rack and rotated thereby, said second pinion gear being connected to the input shaft of a first Geneva mechanism, the output of said Geneva mechanism linked to the valve means on said pressure equalizing means whereby said valve means is opened and closed during a first portion of the total rotation of said drive shaft; a second rack mounted on said locking ring, a third pinion gear meshing with said second rack and rotated thereby, said third pinion gear being connected to the input shaft of a second Geneva mechanism, the output of said second Geneva mechanism being linked to said hinge member whereby said door member can be swung on said hinge member during a last portion of rotation of said drive shaft, said assembly being arranged to effect a door opening sequence of opening the valve means on said pressure equalizing means, unsealing said door member, and swinging said door member on said hinge member, said sequence being carried out within a range of from 90° to 180° rotation of said drive shaft.

14. In a bulkhead and pressure door assembly in accordance with claim 13 in which said resilient seating means comprises a resilient gasket fitted in a groove mounted on said bulkhead, and said sealing means comprises a bead projecting from the peripheral flange surrounding said door member, the thickness of said flange being less than the width of said groove and greater than the width of said bead, whereby said resilient gasket can be extruded from said groove by said flange, stop means being provided to prevent metal to metal contact between bulkhead and said door.

15. A bulkhead and pressure door assembly which comprises a bulkhead provided with an entrance way comprising a circular door opening and a circular neck flange encircling said door opening and having a flanged face, said face having a resilient seating means fitted therein and circumscribing said opening; a pressure equalizing means penetrating said bulkhead and being provided with a valve means; a pressure door comprising a door member registering with said flanged face to enclose said entrance way, a sealing means projecting from the face of said door member cooperating with said resilient seating means whereby a fluid-tight seal is provided between said bulkhead and said door, a hinge member pivotally fastening said door member to said bulkhead, a peripheral door flange surrounding said door member, a plurality of cams mounted in an aligned, spaced relation on said door flange, each of said cams having a straight portion and an oblique portion, said oblique portion being inwardly diverted toward said bulkhead, a rotatable locking ring concentric with said neck flange and door flange, roller means mounted on the inside face of said locking ring and engaging the outside of said flanged face whereby said ring is spaced apart from said neck flange and door flange, a plurality of roller mounts transversely affixed to said locking ring to provide roller mounting areas laterally depending from each side of said ring, a pair of rotatable cam rollers mounted on the door side of the roller mounting areas in astraddle alignment with said cams, a circular guide rail encircling said neck flange intermediate the bulkhead and flanged face, a pair of rotatable guide rollers mounted on the bulkhead side of the roller mounting areas astride said guide rail, and a rotating means for angularly displacing said locking ring whereby said cam rollers engage the oblique portion of said cams and urge said door member respectively into seating and unseating relationship with respect to said door opening, and said cam rollers can be moved in and out of engagement with said cams and said door member can be swung on said hinge member said rotating means comprising a driven shaft and means including a gear box for rotating said shaft, a first sprocket and chain drive interconnecting said shaft and said locking ring, a second sprocket and chain drive interconnecting said shaft and the input shaft of a first Geneva mechanism, the output of said Geneva mechanism linked to the valve means on said pressure equalizing means whereby said valve means is opened and closed, and a third sprocket and chain drive interconnecting said shaft and the input shaft of a second Geneva mechanism, the output of said Geneva mechanism being linked to said hinge member whereby said door member can be swung on said hinge member during a last portion of rotation of said drive shaft, said assembly being arranged to effect a door opening sequence of opening the valve means on said pressure equalizing means, unsealing said door member, and swinging said door member on said hinge member, said sequence being carried out within a range of from 90° to 180° rotation of said drive shaft.

16. In a bulkhead and pressure door assembly in accordance with claim 15 in which said resilient seating means comprises a resilient gasket fitted in a groove mounted on said bulkhead, and said sealing means comprises a bead projecting from the peripheral flange surrounding said door member, the thickness of said flange being less than the width of said groove and greater than the width of said bead, whereby said resilient gasket can be extruded from said groove by said flange, stop means being provided to prevent metal to metal contact between bulkhead and said door.

17. A bulkhead and pressure door assembly which comprises a bulkhead provided with an entrance way comprising a rectangular door opening and a rectangular neck flange encompassing said door opening and having a flanged face, said face having a resilient seating means fitted therein and surrounding said opening; a pressure equalizing means penetrating said bulkhead and being provided with a valve means; a pressure door comprising a door member registering with said flanged face to enclose said entrance way, a sealing means projecting from the face of said door member cooperating with said resilient seating means whereby a fluid-tight seal is provided between said bulkhead and said door, a hinge member pivotally fastening said door member to said bulkhead, a peripheral door flange surrounding said door member, a plurality of cams mounted in an aligned, spaced relation on said door flange, each of said cams having a straight portion and an oblique portion, said oblique portion being inwardly diverted toward said bulkhead, a plurality of roller mount bars positioned along the sides of said peripheral flange and spaced therefrom, said bars being joined by flexible linking means and adapted to move parallel with the flange portion of the door member adjacent each of said bars, a plurality of roller mounts transversely affixed to said roller mount bars to provide roller mounting areas laterally depending from each side of said bars, a pair of rotatable cam rollers mounted on the door side of the roller mounting areas in astraddle alignment with said cams, a guide rail installed on said neck flange intermediate the bulkhead and flanged face; a pair of rotatable guide rollers mounted on the bulkhead side of the roller mounting areas astride said guide rail, and means for positioning said roller mount bars along the portion of the peripheral flange adjacent each of said bars, whereby said cam rollers engage the oblique portion of said cams and urge said door member respectively into seating and unseating relationship with respect to said door opening, and said cam rollers can be moved in and out of engagement with said cams and said door member can be swung on said hinge member, said rotating means comprising a drive shaft, an intermediate gear transmission rotated by said drive shaft including a driven shaft, a first pinion gear driven by said gear transmission, a first rack affixed to one of said roller mount bars and meshing with said pinion, and means including a gear box for rotating said shaft, said driven transmission shaft being connected to the input of a first Geneva mechanism, the output of said Geneva mechanism linked to the valve means on said pressure equalizing means whereby said valve means is opened and closed, a second rack mounted on another of said roller mount bars, a second pinion gear meshing with said second rack and rotated thereby, said second pinion gear being connected to the input shaft of a second Geneva mechanism, the output of said second Geneva mechanism being connected to said hinge member whereby said door member can be swung on said hinge member, said assembly being arranged to effect a door opening sequence of opening the valve means on said pressure equalizing means, unseating said door member, and swinging said door member on said hinge member.

18. In a bulkhead and pressure door assembly in accordance with claim 17 in which said resilient seating means comprises a resilient gasket fitted in a groove mounted on said bulkhead, and said sealing means comprises a bead projecting from the peripheral flange surrounding said door member, the thickness of said flange being less than the width of said groove and greater than the width of said bead, whereby said resilient gasket can be extruded from said groove by said flange, stop means being provided to prevent metal to metal contact between bulkhead and said door.

19. An intermediate airlock between the interior of an enclosed vessel and the exterior thereof comprising a chamber having vertical bulkheads enclosing the ends of said chamber, each of the bulkheads being provided with a door opening having a first sealing means circumscribing said opening and provided with an opening controlled by a valve means whereby the pressure on either side of said bulkhead can be equalized, a pressure door mechanism comprising a door member hinged to said bulkhead and enclosing said door opening, a second sealing means mounted on the face of said door member cooperating with said first sealing means whereby a fluid-tight seal is provided between said bulkhead and said door, a peripheral flange surrounding said door member, a plurality of cams mounted in aligned, spaced relation on said flange, each of said cams having a straight portion and an oblique portion, said oblique portion being inwardly diverted toward said bulkhead, a plurality of cam rollers mounts slidably fitted on guides affixed to said bulkhead, and spaced apart from said peripheral flange, a pair of rotatable cam rollers mounted on each of said mounts in an astraddle alignment with said cams, and means for moving said cam roller mounts coextensively along said cams whereby said cam rollers engage the oblique portion of said cams and urge said door member respectively into seating and unseating relationship with respect to said door opening and said cam rollers are moved out of engagement with said cams whereby said door member can be swung on its hinge, said door mechanism having means for sequentially opening said valve means, unseating and unlocking said door, and swinging said door open; and door control means for opening and closing said door members from the interior and exterior of said chamber, and interlock means cooperating with said door control means whereby the operation of one door and its corresponding equalizing valve is prevented when the other door and its corresponding valve are not locked in a closed position.

20. An intermediate airlock between the interior of an enclosed vessel and the exterior thereof comprising a chamber having vertical bulkheads enclosing the ends of said chamber, each of the bulkheads being provided with a circular door opening having a first sealing means circumscribing said opening and provided with an opening controlled by a valve means whereby the pressure on either side of said bulkhead can be equalized, a pressure door mechanism comprising a circular pressure door member hinged to said bulkhead and enclosing said door opening, a second sealing means mounted on the face of said door member cooperating with said first sealing means whereby a fluid-tight seal is provided between said bulkhead and said door, a peripheral flange surrounding said door member, a plurality of cams mounted in an aligned, spaced relation on said flange, each of said cams having an oblique portion inwardly diverted toward said bulkhead, a circular locking ring concentric with and spaced from said peripheral flange, a plurality of roller mounts transversely mounted on said locking ring to provide a roller mounting area laterally depending from each side of said ring, a pair of rotatable cam rollers mounted on the door-side mounting area in an astraddle alignment with said cams, a circular guide rail depending from said bulkhead, a pair of rotatable guide rollers mounted on the bulkhead-side mounting area astride said guide rail, and means for rotating said locking ring whereby said cam rollers move coextensively with said cams to engage the oblique portion of said cams and urge said door member respectively into seating and unseating relationship with respect to said door member and said cam rollers are moved out of engagement with said cams whereby said door member can be swung on its hinge, said door mechanism having means for sequentially opening said valve control means, unsealing and unlocking said door member and swinging said door open; and door control means for opening and closing said door members from the interior and exterior of said chamber, and interlock means cooperating with said door control means whereby the operation of one door and its corresponding equalizing valve is prevented when the other door and its corresponding valve are not locked in a closed position.

21. An airlock in accordance with claim 20 in which the means for rotating said locking ring comprises a drive shaft, a pinion gear affixed to said shaft, a rack attached to said locking ring and meshing with said pinion, and means for rotating said drive shaft.

22. An airlock in accordance with claim 20 in which means for rotating said locking ring comprises a drive shaft, a sprocket affixed to said drive shaft, a linked chain attached to said locking ring and engaging said sprocket, and means for rotating said drive shaft.

23. An intermediate airlock between the interior of an enclosed vessel and the exterior thereof comprising a chamber having vertical bulkheads enclosing the ends of said chamber, each of the bulkheads being provided with a door opening having a first sealing means circumscribing said opening and provided with an opening controlled by a valve means whereby the pressure on either side of said bulkhead can be equalized, a pressure door mechanism comprising a rectangular pressure door hinged to said bulkhead and enclosing said door opening, a second sealing means mounted on the face of said door member cooperating with said first sealing means whereby a fluid-tight seal is provided between said bulkhead and said door, a peripheral flange surrounding said door member, a plurality of cams mounted in aligned, spaced relation on said flange, each of said cams having an oblique portion, said oblique portion being inwardly diverted toward said bulkhead; a plurality of cam roller-mount bars positioned along the sides of said peripheral flange and spaced therefrom, said bars being joined by flexible linking means and adapted to move parallel with the flange portion of the door adjacent each of said bars, guide means cooperating with said bars attached to said bulkhead, a plurality of cam roller mounts attached to said bars to provide cam roller mounting areas laterally depending from said bars, a pair of rotatable cam rollers mounted on said roller mounts in an astraddle alignment with said cams, and means for positioning said cam roller mount bars along the adjacent peripheral flange portion of said door whereby said cam rollers move coextensively with said cams to engage the oblique portion of said cams and urge said door member respectively into seating and unseating relationship with respect to said door member and said cam rollers are moved out of engagement with said cams whereby said door member can be swung on its hinge, said door mechanism having means for sequentially opening said valve means, unsealing and unlocking, and swinging said door open; and door control means for opening and closing said door members from the interior and exterior of said chamber, and interlock means cooperating with said door control means whereby the operation of one door and its corresponding equalizing valve is prevented when the other door and its corresponding valve are not locked in a closed position.

24. An intermediate airlock between the interior of an enclosed vessel and the exterior thereof comprising a chamber having vertical bulkheads enclosing the ends of said chamber, each of the bulkheads being provided with a door opening having a first sealing means circumscribing said opening and provided with an opening controlled by a valve means whereby the pressure on either side of said bulkhead can be equalized, a pressure door mechanism comprising a rectangular pressure door hinged to said bulkhead and enclosing said door opening, a second sealing means mounted on the face of said door member cooperating with said seating means whereby a fluid-tight seal is provided between said bulkhead and said door, a peripheral flange surrounding said door member, a plurality of cams mounted in aligned, spaced relation on said flange, each of said cams having an oblique portion, said oblique portion being inwardly diverted toward said bulkhead, a plurality of roller-mount bars positioned along the sides of said peripheral flange and spaced therefrom, said bars being joined by flexible linking means and adapted to move parallel with the flange portion of the door adjacent each of said bars, guide rails attached to said bulkhead, a plurality of roller mounts transversely attached to said bars to provide roller mounting areas laterally depending from each side of said bars, a pair of rotatable cam rollers mounted on the door-side mounting area of each of said roller mounts in an astraddle alignment with said cams, guide rails depending from said bulkhead, a pair of rotatable guide rollers mounted on the bulkhead-side mounting area astride said guide rail and means for positioning said roller mount bars along the adjacent peripheral flange portion of said door member whereby said cam rollers move coextensively with said cams to engage the oblique portion of said cams and urge said door member respectively into seating and unseating relationship with respect to said door member and said cam rollers are moved out of engagement with said cams whereby said door member can be swung on its hinge, said combination having means for sequentially opening said valve means, unsealing and unlocking said door, and swinging said door open; and door control means for opening and closing said door members from the interior and exterior of said chamber, and interlock means cooperating with said door control means whereby the operation of one door and its corresponding equalizing valve is prevented when the other door and its corresponding valve are not locked in a closed position.

25. An intermediate airlock between the interior of an enclosed vessel and the exterior thereof comprising a chamber, the ends of which being enclosed by means of a bulkhead and pressure door assembly which comprises a bulkhead provided with an entrance way comprising a circular door opening and a circular neck flange encircling said door opening and having a flanged face, said face having a resilient seating means fitted therein and circumscribing said opening; a pressure equalizing means penetrating said bulkhead and being provided with a valve means; a pressure door comprising a door member registering with said flanged face to enclose said entrance way, said door member being hinged to swing toward the interior of said vessel, a sealing means projecting from the face of said door member cooperating with said resilient seating means whereby a fluid-tight seal is provided between said bulkhead and said door, a hinge member pivotally fastening said door member to said bulkhead, a peripheral door flange surrounding said door member, a plurality of cams mounted in an aligned, spaced relation on said door flange, each of said cams having a straight portion and an oblique portion, said oblique portion being inwardly diverted toward said bulkhead, a rotatable locking ring concentric with said neck flange and door flange, roller means mounted on the inside face of said locking ring and engaging the outside of said flanged face whereby said ring is spaced apart from said neck flange and door flange, a plurality of roller mounts transversely affixed to said locking ring to provide roller mounting areas laterally depending from each side of said ring, a pair of rotatable cam rollers mounted on the door side of the roller mounting areas in astraddle alignment with said cams, a circular guide rail encircling said neck flange intermediate the bulkhead and flanged face, a pair of rotatable guide rollers mounted on the bulkhead side of the roller mounting areas astride said guide rail, and a rotating means for angularly displacing said locking ring whereby said cam rollers engage the oblique portion of said cams and urge said door member respectively into seating and unseating relationship with respect to said door opening, and said cam rollers can be moved in and out of engagement with said cams and said door member can be swung on said hinge member, said rotating means comprising a drive shaft, a first pinion gear secured to said drive shaft, a first rack affixed to said locking ring and meshing with said pinion, and means including a gear box for rotating said shaft, a second pinion gear enmeshing with said first rack and rotated thereby, said second pinion gear being connected to the input shaft of a first Geneva mechanism, the output of said Geneva mechanism linked to the valve means on said pressure equalizing means whereby said valve means is opened and closed; a second rack mounted on said locking ring, a third pinion gear meshing with said second rack and rotated thereby, said third pinion gear being connected to the input shaft of a second Geneva mechanism, the output of said second Geneva mechanism being linked to said hinge member whereby said door member can be swung on said hinge member during a last portion of the rotation of said drive shaft, said assembly being arranged to effect a door opening sequence of opening the valve means on said pressure equalizing means, unsealing said door member, and swinging said door member on said hinge member, said sequence being carried out within a range of from 90° to 180° rotation of said drive shaft; and door control means for opening and closing said door members from the interior and exterior of said chamber, and interlock means cooperating with said door control means whereby the operation of one door and its corresponding equalizing valve is prevented when the other door and its corresponding valve are not locked in a closed position.

26. In a bulkhead and pressure door assembly in accordance with claim 25 in which said resilient seating means comprises a resilient gasket fitted in a groove mounted on said bulkhead, and said sealing means comprises a bead projecting from the peripheral flange surrounding said door member, the thickness of said flange being less than the width of said groove and greater than the width of said bead, whereby said resilient gasket can be extruded from said groove by said flange, stop means being provided to prevent metal to metal contact between bulkhead and said door.

27. An intermediate airlock between the interior of an enclosed vessel and the exterior thereof comprising a chamber, the ends of which being enclosed by means of a bulkhead and pressure door assembly which comprises a bulkhead provided with an entrance way comprising a circular door opening and a circular neck flange encircling said door opening and having a flanged face, said face having a resilient seating means fitted therein and circumscribing said opening; a pressure equalizing means penetrating said bulkhead and being provided with a valve means; a pressure door comprising a door member registering with said flanged face to enclose said entrance way, said door member being hinged to swing toward the interior of said vessel, a sealing means projecting from the face of said door member cooperating with said resilient seating means whereby a fluid-tight seal is provided between said bulkhead and said door, a hinge member pivotally fastening said door member to said bulkhead, a peripheral door flange surrounding said door member, a plurality of cams mounted in an aligned, spaced relation on said door flange, each of said cams having a straight portion and an oblique portion, said oblique portion being inwardly diverted toward said bulkhead, a rotatable locking ring concentric with said neck flange and door flange, roller means mounted on the inside face of said locking ring and engaging the outside of said flanged face whereby said ring is spaced apart from said neck flange and door flange, a plurality of roller mounts transversely affixed to said locking ring to provide roller mounting areas laterally depending from each side of said ring, a pair of rotatable cam rollers mounted on the door side of the roller mounting areas in astraddle alignment with said cams, a circular guide rail encircling said neck flange intermediate the bulkhead and flanged face, a pair of rotatable guide rollers mounted on the bulkhead side of the roller mounting areas astride said guide rail, and a rotating means for angularly displacing said locking ring whereby said cam rollers engage the oblique portion of said cams and urge said door member respectively into seating and unseating relationship with respect to said door opening, and said cam rollers can be moved in and out of engagement with said cams and said door member can be swung on said hinge member, said rotating means comprising a driven shaft and means including a gear box for rotating said shaft, a first sprocket and chain drive interconnecting said shaft and said locking ring, a second sprocket and chain drive interconnecting said shaft and the input shaft of a first Geneva mechanism, the output of said Geneva mechanism linked to the valve means on said pressure equalizing means whereby said valve means is opened and closed, and a third sprocket and chain drive interconnecting said shaft and the input shaft of a second Geneva mechanism, the output of said Geneva mechanism being linked to said hinge member whereby said door member can be swung on said hinge member during a last portion of the rotation of said drive shaft, said assembly being arranged to effect a door opening sequence of opening the valve means on said pressure equalizing means, unsealing said door member, and swinging said door member on said hinge member, said sequence being carried out within a range of from 90° to 180° rotation of said drive shaft; and door control means for opening and closing said door members from the interior and exterior of said chamber, and interlock means cooperating with said door control means whereby the operation of one door and its corresponding equalizing valve is prevented when the other door and its corresponding valve are not locked in a closed position.

28. In a bulkhead and pressure door assembly in accordance with claim 27 in which said resilient seating means comprises a resilient gasket fitted in a groove mounted on said bulkhead, and said sealing means comprises a bead projecting from the peripheral flange surrounding said door member, the thickness of said flange being less than the width of said groove and greater than the width of said bead, whereby said resilient gasket can be extruded from said groove by said flange, stop means being provided to prevent metal to metal contact between bulkhead and said door.

29. An intermediate airlock between the interior of an enclosed vessel and the exterior thereof comprising a chamber, the ends of which being enclosed by means of a bulkhead and pressure door assembly which comprises a bulkhead provided with an entrance way comprising a rectangular door opening and a rectangular neck flange encompassing said door opening and having a flanged face, said face having a resilient seating means fitted therein and surrounding said opening; a pressure equalizing means penetrating said bulkhead and being provided with a valve means; a pressure door comprising a door member registering with said flanged face to enclose said entrance way, said door member being hinged to swing towards the interior of said vessel, a sealing means projecting from the face of said door member cooperating with said resilient seating means whereby a fluid-tight seal is provided between said bulkhead and said door, a hinge member pivotally fastening said door member to said bulkhead, a peripheral door flange surrounding said door member, a plurality of cams mounted in an aligned, spaced relation on said door flange, each of said cams having a straight portion and an oblique portion, said oblique portion being inwardly diverted toward said bulkhead, a plurality of roller mount bars positioned along the sides of said peripheral flange and spaced therefrom, said bars being joined by flexible linking means and adapted to move parallel with the flange portion of the door member adjacent each of said bars, a plurality of roller mounts transversely affixed to said roller mount bars to provide roller mounting areas laterally depending from each side of said bars, a pair of rotatable cam rollers mounted on the door side of the roller mounting areas in astraddle alignment with said cams, a guide rail installed on said neck flange intermediate the bulkhead and flanged face, a pair of rotatable guide rollers mounted on the bulkhead side of the roller mounting areas astride said guide rail, and means for positioning said roller mount bars along the portion of the peripheral flange adjacent each of said bars, whereby said cam rollers engage the oblique portion of said cams and urge said door member respectively into seating and unseating relationship with respect to said door opening, and said cam rollers can be moved in and out of engagement with said cams and said door member can be swung on said hinge member, said rotating means comprising a drive shaft, an intermediate gear transmission rotated by said drive shaft including a driven shaft, a first pinion gear driven by said gear transmission, a first rack affixed to one of said roller mount bars and meshing with said pinion, and means including a gear box for rotating said shaft, said driven transmission shaft being connected to the input of a first Geneva mechanism, the output of said Geneva mechanism linked to the valve means on said pressure equalizing means whereby said valve means is opened and closed; a second rack mounted on another of said roller mount bars, a second pinion gear meshing with said second rack and rotated thereby, said second pinion gear being connected to the input shaft of a second Geneva mechanism, the output of said second Geneva mechanism being connected to said hinge member whereby said door member can be swung on said hinge member during a last portion of the rotation of said drive shaft, said assembly being arranged to effect a door opening sequence of opening the valve means on said pressure equalizing means, unseating said door member, and swinging said door member on said hinge member, said sequence being carried out within a range of from 90° to 180° rotation of said drive shaft, and door control means for opening and closing said door members from the interior and exterior of said chamber, and interlock means cooperating with said door control means whereby the operation of one door and its corresponding equalizing valve is prevented when the other door and its corresponding valve are not locked in a closed position.

30. In a bulkhead and pressure door assembly in accordance with claim 29 in which said resilient seating means comprises a resilient gasket fitted in a groove mounted on said bulkhead, and said sealing means comprises a bead projecting from the peripheral flange surrounding said door member, the thickness of said flange being less than the width of said groove and greater than the width of said bead, whereby said resilient gasket can be extruded from said groove by said flange, stop means being provided to prevent metal to metal contact between bulkhead and said door.

No references cited.